(12) United States Patent
Franke et al.

(10) Patent No.: US 12,547,158 B2
(45) Date of Patent: Feb. 10, 2026

(54) METHOD FOR GENERATING A DIGITAL REPRESENTATION OF A PROCESS AUTOMATION SYSTEM ON A CLOUD-BASED SERVICE PLATFORM

(71) Applicant: Endress+Hauser Process Solutions AG, Reinach (CH)

(72) Inventors: Alexander Franke, Birsfelden (CH); Stefan Griner, Lausen (CH); Joachim Wagner, Lörrach (DE); Michael Voegel, Hagenthal le bas (FR)

(73) Assignee: Endress+Hauser Process Solutions AG, Reinach (CH)

( * ) Notice: Subject to any disclaimer, the term of this patent is extended or adjusted under 35 U.S.C. 154(b) by 427 days.

(21) Appl. No.: 18/257,721

(22) PCT Filed: Nov. 18, 2021

(86) PCT No.: PCT/EP2021/082186
§ 371 (c)(1),
(2) Date: Jun. 15, 2023

(87) PCT Pub. No.: WO2022/128322
PCT Pub. Date: Jun. 23, 2022

(65) Prior Publication Data
US 2024/0085888 A1    Mar. 14, 2024

(30) Foreign Application Priority Data

Dec. 15, 2020   (DE) .................... 10 2020 133 618.7

(51) Int. Cl.
*G05B 19/418*   (2006.01)
(52) U.S. Cl.
CPC ..... *G05B 19/4185* (2013.01); *G05B 19/4183* (2013.01); *G05B 19/41885* (2013.01)

(58) Field of Classification Search
CPC ............ G05B 19/4185; G05B 19/4183; G05B 19/41885
See application file for complete search history.

(56) References Cited

U.S. PATENT DOCUMENTS

| 2018/0292983 | A1 | 10/2018 | Nor et al. |
| 2019/0079498 | A1 | 3/2019 | Ota et al. |
| 2020/0193700 | A1* | 6/2020 | Vandenbrouck ........ G06F 30/12 |

FOREIGN PATENT DOCUMENTS

| DE | 102007062914 A1 | 10/2015 |
| DE | 10394010 B4 | 12/2017 |

(Continued)

*Primary Examiner* — Gary Collins
(74) *Attorney, Agent, or Firm* — Kelly J. Smith; Endress+Hauser (USA) Holding, Inc.

(57) ABSTRACT

Generating a digital representation of a process automation system on a cloud-based service platform uses assets integrated into measurement points. The method includes reading TAG information using an edge device, wherein the TAG information is provided in a character chain data type and represents the hierarchical structure of the respective asset. The method also includes transmitting the TAG information to the cloud-based service platform, and parsing the TAG information using an application, wherein a logic is used for the parsing process, and the name of the asset and the name of the measurement point in which the respective asset is integrated are extracted from the TAG information. A structure plan of the system is generated using the application having all of the system measurement points extracted from the TAG information together with all of the assets which are assigned to the measurement points and are extracted from the TAG information.

8 Claims, 1 Drawing Sheet

(56) References Cited

FOREIGN PATENT DOCUMENTS

| | | |
|---|---|---|
| DE | 102016124350 A1 | 6/2018 |
| DE | 102019119714 A1 | 1/2021 |
| EP | 3070550 A1 | 9/2016 |
| EP | 3696622 A1 | 8/2020 |

\* cited by examiner

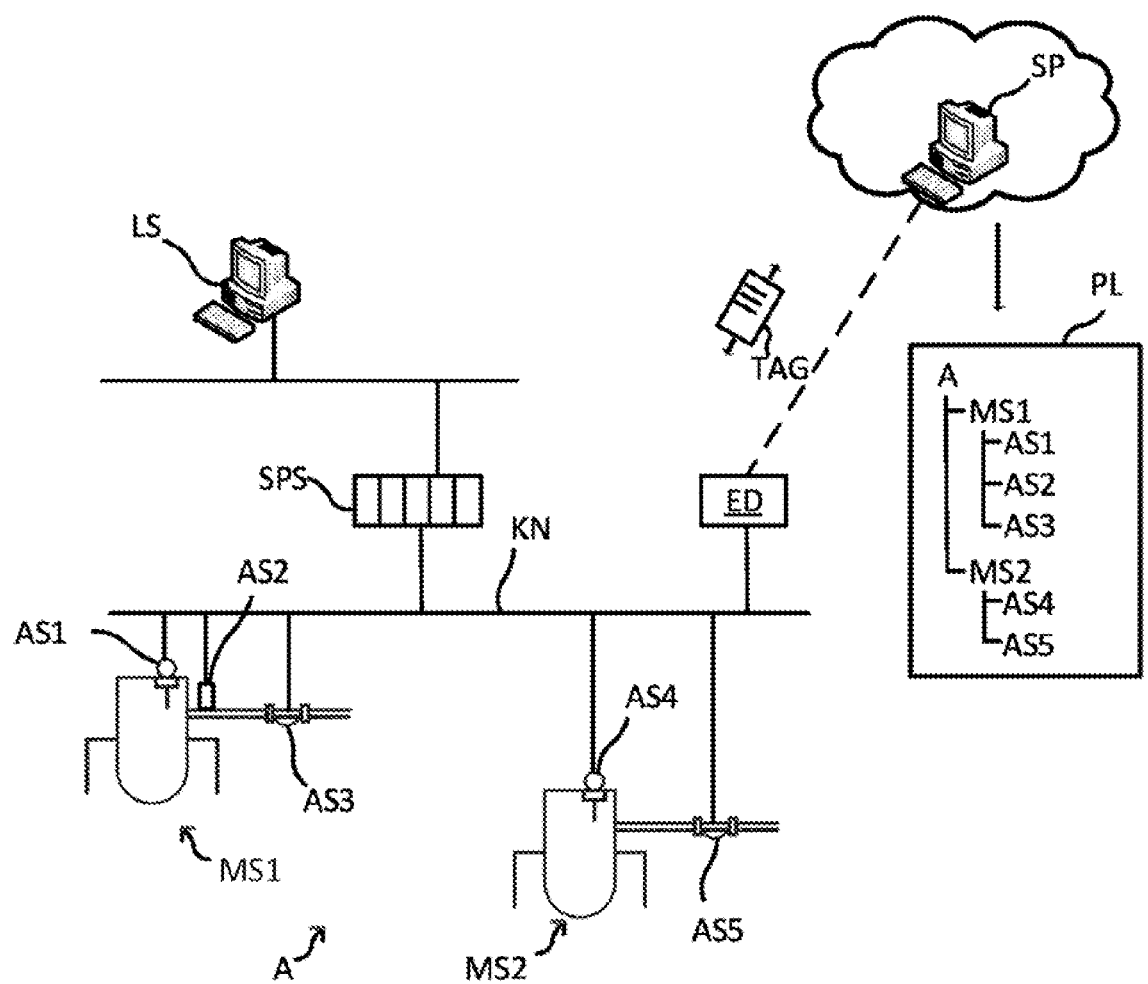

METHOD FOR GENERATING A DIGITAL REPRESENTATION OF A PROCESS AUTOMATION SYSTEM ON A CLOUD-BASED SERVICE PLATFORM

CROSS-REFERENCE TO RELATED APPLICATIONS

The present application is related to and claims the priority benefit of DPMA Patent Application No. 10 2020 133 618.7, filed on Dec. 15, 2020, and International Patent Application No. PCT/EP2021/082186, filed Nov. 18, 2021, the entire contents of which are incorporated herein by reference.

TECHNICAL FIELD

The invention relates to a method for generating a digital representation of a process automation system on a cloud-based service platform, wherein the system has a plurality of measurement points and assets, in particular field devices, wherein one or more assets are integrated into each of the measurement points, wherein the assets are in communication with an edge device via a communication network, and wherein the edge device contacts the cloud-based service platform via the Internet and transmits data relating to the assets to the cloud-based service platform.

BACKGROUND

Field devices that are used in industrial installations are already known from the prior art. Field devices are often used in process automation engineering, as well as in manufacturing automation engineering. In principle, all devices which are process-oriented and which supply or process process-relevant information are referred to as field devices. Field devices are thus used for detecting and/or influencing process variables. Measuring devices, or sensors, are used for detecting process variables. These are used, for example, for pressure and temperature measurement, conductivity measurement, flow measurement, pH measurement, fill level measurement etc., and detect the corresponding process variables of pressure, temperature, conductivity, pH value, fill level, flow etc. Actuators are used for influencing process variables. These are, for example, pumps or valves that can influence the flow of a fluid in a pipe or the fill level in a tank. In addition to the aforementioned measuring devices and actuators, field devices are also understood to include remote I/Os, radio adapters, or, generally, devices that are arranged at the field level.

A multitude of such field devices is produced and marketed by the Endress+Hauser group.

In modern industrial plants, field devices are usually connected to superordinate units via communication networks such as fieldbuses (Profibus®, Foundation® Fieldbus, HART® etc.). Usually, the superordinate units are control systems or control units, such as, for example, a SPC (stored program control). The superordinate units are used for, among other things, process control, process visualization, and process monitoring, as well as commissioning of the field devices. The measured values recorded by the field devices, especially by sensors, are transmitted via the respective bus system to a (or in some cases a plurality of) superordinate unit(s). In addition, data transmission from the superordinate unit via the bus system to the field devices is also required, especially for configuration and parameterization of field devices and for controlling actuators.

The components or devices used in the system, i.e. field devices, network devices such as gateways, edge devices, etc. and control units, are referred to as assets.

In addition to the process values, field devices in the automation industry also provide analysis and status data, which are of crucial importance for the maintenance and care of the assets as well as for evaluating the condition of the system parts in which they are installed. For the best and most comprehensive analysis of the data obtained from the field devices, it is necessary to collect them centrally and make them available in a differentiated manner to the groups of people and evaluation systems that can contribute their expertise to the evaluation of the conditions of system parts and their assets. There are now service providers for the data storage, data security and data processing functions required for this, such as the company "Endress+Hauser" with its "Netilion" platform.

In order to be able to transport these data from assets to the cloud (a cloud-capable service platform which can be contacted via the Internet) within the scope of the above-mentioned digital services, edge devices are used which monitor or retrieve data from the assets and upload them to the cloud via the Internet.

The data collected by the Assets in this way are nowadays typically transmitted in an unsorted manner from the corresponding edge devices to the cloud. The digitized system data present in the cloud do not reflect reality, neither functionally nor geographically. It is therefore difficult for the user to identify the relevant parts of their system. In order for the digital image of the system in the cloud to reflect reality to a greater extent, the user has to invest considerable work effort, with all the associated disadvantages of manual work processes.

SUMMARY

The object of the invention is to provide a method which allows simple structuring of the data relating to assets that are transferred to a cloud.

The object is achieved by a method for generating a digital representation of a process automation system on a cloud-based service platform, wherein the system has a plurality of measurement points and assets, in particular field devices, wherein one or more assets are integrated into each of the measurement points, wherein the assets are in communication with an edge device via a communication network, and wherein the edge device contacts the cloud-based service platform via the Internet and transmits data relating to the assets to the cloud-based service platform, the method comprising:

reading TAG information from each of the assets by means of an edge device, said TAG information being provided in a character chain data type, in particular a string data type, and representing the hierarchical structure of the respective asset in the system;

transmitting the TAG information from the edge device to the cloud-based service platform;

parsing all of the TAG information using an application run on the cloud-based service platform, wherein a logic is used for the parsing process, and at least the name of the asset and the name of the measurement point in which the respective asset is integrated are extracted from the TAG information in each case using the logic; and generating a structure plan of the system using the application, said structure plan having all of the system measurement points extracted from the TAG information together with all of the assets which are assigned to the measurement points and are extracted from the TAG information.

The advantage of the method according to the invention is that the structure of a system is automatically generated in the cloud-based service platform. For this purpose, the TAG information about all assets is read and analyzed or parsed. The TAG information is assigned to an asset during installation and commissioning in the corresponding measurement point of the system. Usually, a system or format of the respective customer is used for the TAG information, meaning that there is typically no consistency in TAG information. However, the parsing process searches for patterns within the TAG information. For example, the content of the TAG information is frequently very similar and typically contains at least the name of the corresponding asset and the name of the measurement point in which the respective asset is integrated. After analyzing, or parsing, the information obtained from the TAG information is added to a structure plan such that it contains the measurement points located in the system correlated with the assets located in the measurement points. If data relating to an asset are subsequently loaded into the cloud by means of the edge device, they can be stored on the cloud-based service platform in a sorted manner according to the structure plan and then called up in a sorted manner according to the structure plan.

For the purposes of the method according to the invention, assets are understood to be all devices used in a system, in particular field devices, network devices and control devices. Examples of field devices have already been listed in the introductory part of the description.

A "cloud-based service platform" refers to a server which can be contacted for a user via the Internet and on which one or more applications are run which enable display, processing and management of data relating to the assets of a system.

According to an advantageous embodiment of the method according to the invention, it is provided that the logic is generated based on user-defined rules. In this case, the application provides the user with a user interface in which they can enter the user-defined rules. This is particularly suitable when the TAG information in a system follows a systematic or consistent structure.

Advantageously, the user-defined rules contain at least one of the following pieces of information:
 the format of the TAG information;
 a prescribed position, length and/or order of the name of the asset and/or the name of the measurement point in the TAG information;
 separators indicating the beginning and/or the end of the name of the asset and/or the name of the measurement point in the TAG information.

Possible separators are, for example, dots, commas, hyphens, underscores, or the like.

According to an advantageous embodiment of the method according to the invention, it is provided that the logic uses an AI algorithm, wherein the AI algorithm is learned by means of training data, and wherein the training data consist of structure plans of further assets correlated with the TAG information relating to the assets contained in the structure plans of the further assets. In particular, the TAG information is examined in such a way that the format, keywords (e.g. typical designations for assets and/or measurement points), separators or the like are automatically detected and correctly interpreted. The AI algorithm can also be learned with training data from databases of the manufacturer, for example in databases concerning the life cycle of the field devices, in which corresponding TAG information relating to the field devices is stored. According to an advantageous development of the method according to the invention, it is provided that the application or a further application run on the cloud-based service platform generates a virtual two- or three-dimensional map of the system on the basis of the structure plan, on which map the location of the measurement points and the assets assigned to the measurement points are geographically visualized. The user thus has the advantage of seeing their system visually represented on the cloud-based service platform. This simplifies the assignment of the assets and the data relating to the assets. It is also easier to identify any incorrect assignments.

In order to render the graphical illustration of the system as realistically as possible on the map, it is possible to include further available information relating to the field devices. For example, the device type of a field device can be queried so that a corresponding correct symbol is placed on the map (flow meter, pump, etc.).

If information about a field device is not available, information from an adjacent field device can also be used. For example, the TAG information is used to detect that a second field device should be in the same location as a first field device in the system. Thus, the location information relating to the first field device can be transferred to the second field device.

According to an advantageous embodiment of the method according to the invention, it is provided that the map, if two-dimensional, is generated on the basis of an image inserted into the application, or wherein the map, if three-dimensional, is generated on the basis of a three-dimensional system model. The installation positions or location positions of the measurement points are added to the image or the system model. The names of the associated assets are then added to the measurement points.

According to an advantageous embodiment of the method according to the invention, it is provided that a geographical position of the measurement points on the map is determined and/or changed manually for the first time. The user can assign the installation positions or location positions of the measurement points via a graphical user interface. For this purpose, the user can, for example, drag a symbol or text field representing the measurement point or the name of the measurement point from the structure plan to the corresponding position on the map. Changes to the position can be made by dragging and dropping.

According to an advantageous embodiment of the method according to the invention, it is provided that for the TAG information from which the name of the asset and/or the name of the measurement point in which the respective asset is integrated cannot be extracted, the corresponding name of the asset and/or the corresponding name of the measurement point is manually added to the structure plan. In this case, it can be provided that the user receives a message after parsing or analysis has been completed, which message requires the user to enter the missing information relating to the corresponding TAG information.

BRIEF DESCRIPTION OF THE DRAWINGS

The invention is explained in greater detail with reference to the following figures, in which:

FIG. 1 shows an exemplary embodiment of the method according to the present disclosure.

DETAILED DESCRIPTION

Parts of a process automation system A are depicted in FIG. 1. Specifically, these are two measurement points MS1, MS2, which have several assets AS1, AS2, AS3, AS4, AS5, which are field devices. These measurement points respectively consist of a tank and a pipeline which discharges from the tank. For measuring the fill level of the tank as a process variable, a fill level measuring device is attached as asset AS1, AS4 to the tank in each case, for example with a radar as sensor unit. For measuring the flow rate in the pipeline, a flow meter is attached in each case as asset a field device AS3, AS5, whose sensor unit determines the flow rate of a medium flowing through the pipeline as a primary process variable according to the Coriolis principle. Furthermore, a temperature measuring device is attached in the measurement point MS1 as an asset AS2, which determines the temperature of the measuring medium flowing through the pipeline by means of a high-precision temperature sensor as sensor unit.

The assets AS1, . . . , AS5 are interconnected by means of a communication network KN and are in communication with one another. The communication network KN is in particular an Ethernet network. Alternatively, the communication network KN is a fieldbus according to one of the known fieldbus standards, for example Profibus, Foundation Fieldbus or HART.

The communication network KN contains a superordinate unit PLC, for example a programmable logic controller, which transmits commands to the assets AS11, . . . , AS5, whereupon the assets AS1, . . . , AS5 transmit process values, diagnostic data and status information to the superordinate unit PLC. These process values, diagnostic data and status information are forwarded by the superordinate unit PLC to a workstation PC in the control station LS of the system A. Said workstation PC is used, inter alia, for process visualization, process monitoring and engineering as well as for operating and monitoring the assets AS1, . . . , AS5.

Furthermore, the communication network KN an edge device ED, which monitors the process values, diagnostic data and status information transmitted by the assets AS1, . . . , AS5 contained in the respective measurement point MS1, MS2 to the superordinate unit PLC and, if necessary, queries further data from the assets AS1, . . . , AS5.

Via the Internet, the data processing unit DV1, DV2 establishes a communication link to a service platform SP. The service platform SP is designed to run applications. For example, one such application is a plant asset management system that is used to manage the assets AS1, . . . , AS5.

After the communication link to the cloud-based service platform SP has been established, the edge device transmits the monitored and/or recorded data relating to the assets AS1, . . . , AS5 to the cloud-based service platform SP. In order to store the data there in a structured manner, a structure plan PL is used, which in particular is provided as a tree structure and contains an assignment of all of the assets AS1, . . . , AS5 contained in the system A to their measurement points MS1, MS2.

In order not to have to generate this structure plan SP manually, the Edge Device ED queries the TAG information TAG relating to all assets AS1, . . . , AS5 to generate the structure plan ED. The TAG information TAG is assigned to an asset AS1, . . . , AS5 during installation and commissioning in the corresponding measurement point MS1, MS2 of the system and usually contains references to the system A, the measurement point MS1, MS2 and the name of the asset AS1, . . . , AS5.

The read TAG information TAG is transmitted from the edge device ED to the cloud-based service platform SP. An application run on the cloud-based service platform SP then parses the TAG information using logic and extracts at least the names of the assets AS1, . . . , AS5, as well as the measurement points MS1, MS2 in which the corresponding assets AS1, . . . , AS5 are used.

For this purpose, the logic uses either a set of rules entered by the user or an AI algorithm. In both cases, the TAG information TAG is examined for certain components, such as separators or prescribed position, length and/or order of the name of the assets AS1, . . . , AS5 and/or the name of the measurement point MS1, MS2.

For example, the read TAG information relating to the asset AS4 is:

Plant123_Unit23_LT01

The logic knows, on the basis of the user-defined rules, that the TAG information TAG contains first the name of the system A, then the name of the measurement point MS1, MS2 and finally the name of the asset AS1, . . . , AS5. The individual pieces of information are separated from one another by underscores as separators. Furthermore, the logic knows that the name of an asset AS1, . . . , AS5 has four digits in the present case. Knowing these properties, the logic extracts the name of the system A ("Plant123"), the name of the measurement point MS2 (Unit23), and the name of the asset AS4 ("LT01").

This process is repeated for all Assets AS1, . . . , AS5. In the event that a piece of information cannot be read from the TAG information, the user receives a message after parsing or analysis has been completed, which message requires the user to enter the missing information relating to the corresponding TAG information.

Finally, the structure plan PL is generated based on the extracted or manually entered information. In the structural plan PL, the assets AS1, . . . , AS5 are assigned to their corresponding measurement points MS1, MS2. In the example described above, the asset AS4 could be sorted as follows:

Plant 123
↳Unit23
↳LT01

The data relating to the assets AS1, . . . , AS5 transmitted from the edge device ED to the cloud-based service platform SP are now stored in a sorted manner according to the structure plan PL and can then be called up in a sorted manner according to the structure plan PL. The structure plan PL can further be visualized in a map of the system (e.g. similar to the arrangement of the measurement points as shown in FIG. 1), which displays the spatial positions of all measurement points MS1, MS2 and the assigned assets.

The described method automatically structures the data such that they better correspond to the real system A and are more readable for the user. It also reduces the manual work required to generate the digital representation of the system in the cloud-based service platform SP, resulting in greater efficiency and a lower percentage of errors.

The invention claimed is:

1. A method for generating a digital representation of a process automation system on a cloud-based service platform, wherein the system has a plurality of measurement points and assets, wherein one or more assets are integrated into each of the measurement points, wherein the assets are in communication with an edge device via a communication network, and wherein the edge device contacts the cloud-based service platform via the Internet and transmits data relating to the assets to the cloud-based service platform, the method comprising:

reading TAG information from each of the assets using the edge device, said TAG information being provided in a character chain data type and representing a hierarchical structure of the respective asset in the system;

transmitting the TAG information from the edge device to the cloud-based service platform;

parsing all of the TAG information using an application run on the cloud-based service platform, wherein a logic is used for the parsing process, and at least the name of the asset and the name of the measurement point in which the respective asset is integrated are extracted from the TAG information in each case using the logic; and generating a structure plan of the system using the application, said structure plan having all of the system measurement points extracted from the TAG information together with all of the assets which are assigned to the measurement points and are extracted from the TAG information.

2. The method of claim 1, wherein the logic is generated based on user-defined rules.

3. The method of claim 2, wherein the user-defined rules contain at least one of the following pieces of information:

the format of the TAG information;

a prescribed position, length or order of the name of the asset or the name of the measurement point in the TAG information;

separators indicating the beginning or the end of the name of the asset or the name of the measurement point in the TAG information.

4. The method of claim 1, wherein the logic uses an AI algorithm, wherein the AI algorithm is learned using training data, and wherein the training data consist of structure plans of further assets correlated with the TAG information of the assets contained in the structure plans of the further assets.

5. The method of claim 1, wherein the application or a further application run on the cloud-based service platform generates a virtual two- or three-dimensional map of the system on the basis of the structure plan, on which map the location of the measurement points and the assets assigned to the measurement points are geographically visualized.

6. The method of claim 5, wherein the map, if two-dimensional, is generated on the basis of an image inserted into the application, or wherein the map, if three-dimensional, is generated on the basis of a three-dimensional system model.

7. The method of claim 5, wherein a geographical position of the measurement points on the map is determined or changed manually for the first time.

8. The method of claim 1, wherein for the TAG information from which the name of the asset or the name of the measurement point in which the respective asset is integrated cannot be extracted, the corresponding name of the asset or the corresponding name of the measurement point is manually added to the structure plan.

\* \* \* \* \*